United States Patent [19]
Kurome et al.

[11] Patent Number: 4,664,530
[45] Date of Patent: May 12, 1987

[54] KITCHEN DEVICE

[75] Inventors: Shosaku Kurome; Yosinari Maeda; Hiromi Emoto, all of Hyogo, Japan

[73] Assignee: Sanyo Electric Co., Ltd., Japan

[21] Appl. No.: 894,382

[22] Filed: Aug. 7, 1986

Related U.S. Application Data

[63] Continuation of Ser. No. 700,305, Feb. 11, 1985, abandoned.

[30] Foreign Application Priority Data

Feb. 16, 1984 [JP] Japan ................................. 59-27598

[51] Int. Cl.$^4$ ............................................. B01F 7/16
[52] U.S. Cl. .................................. 366/205; 366/279; 366/314; 366/343
[58] Field of Search ............... 366/129, 130, 197, 199, 366/205, 206, 279, 314, 315, 342, 343, 605

[56] References Cited

U.S. PATENT DOCUMENTS

| | | | |
|---|---|---|---|
| 1,119,370 | 12/1914 | Queal | 366/279 X |
| 2,516,327 | 7/1950 | Kuhn | 366/314 X |
| 4,201,487 | 5/1980 | Backhaus | 366/314 X |

FOREIGN PATENT DOCUMENTS 1218902 3/1959 France ................................. 366/314

Primary Examiner—Timothy F. Simone
Attorney, Agent, or Firm—Darby & Darby

[57] ABSTRACT

A kitchen device suitable for foaming food materials, comprising a container for reception of food materials to be whipped by a rotary member which is specific in shape and is mounted at the inside bottom of the container, the member being moved about its vertical axis by a driving mechanism provided outside the container. The configuration of the rotary member is substantially a cone containing a side peripheral portion which is concave or inwardly curved in vertical cross-section.

3 Claims, 36 Drawing Figures

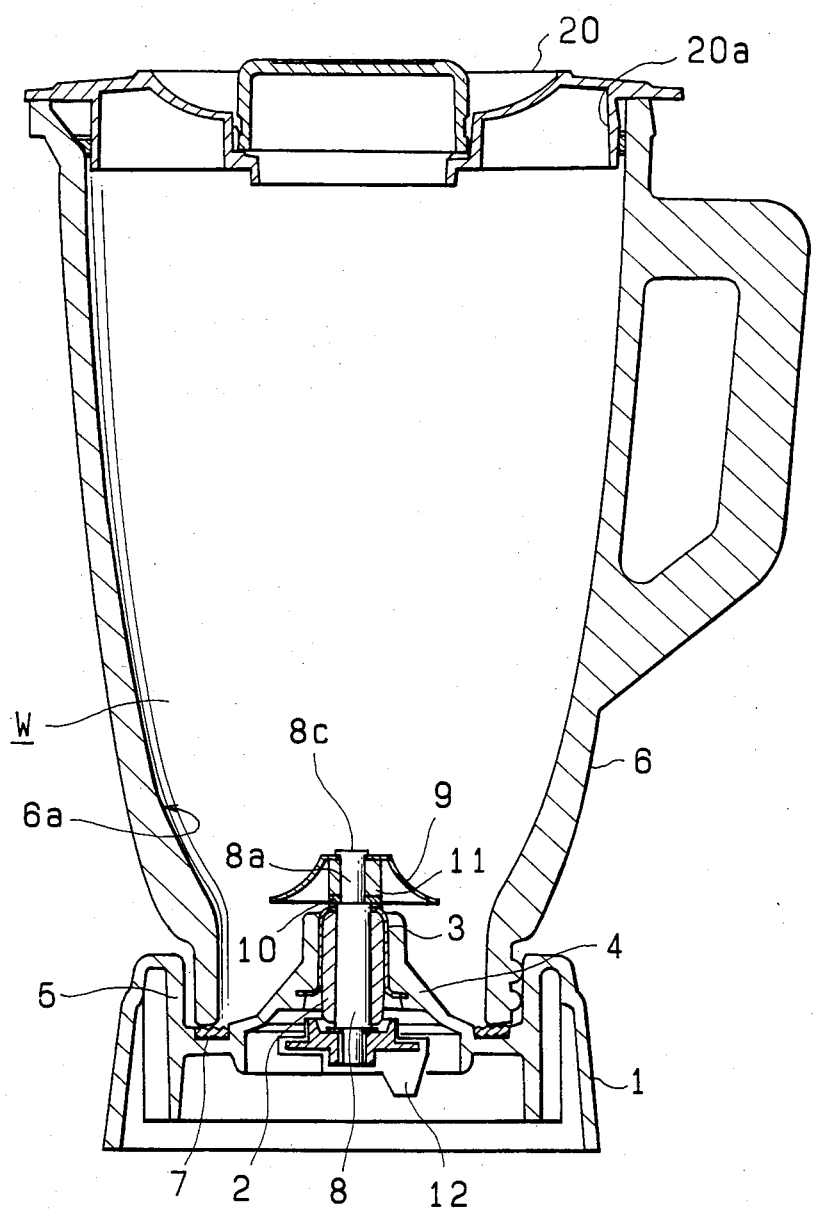

KITCHEN DEVICE

This is a continuation of application Ser. No. 06/700,305, filed Feb. 11, 1985.

FIELD OF THE INVENTION

The present invention relates to a kitchen device, and particularly to a kitchen device for whipping semifluid food materials received in a container, by moving a rotary member in the shape of substantially a cone with a concave side portion, which member is mounted at the inside bottom of the container, at high speed about its vertical axis by a driving mechanism, which is provided outside the container.

DESCRIPTION OF THE PRIOR ART

Japanese Utility Model Publication Nos. 52-22074 (1977) and 54-13419 (1979) disclose a kitchen device which can whip food materials, for instance, the white of eggs, by moving a half-spindle-shaped rotary member, which is mounted at the inside bottom of a cup-shaped container, about its vertical axis at high speed, for instance, 10,000 rpm.

However, such a kitchen device had a difficulty in obtaining the desired result. Generally, upon whipping the food material such as an egg white, air bubbles generate in the white material, protein molecules comprised in the white material adhered to the surfaces of the air bubbles, and the molecules changed in quality due to contact with air. With the progress of whipping, the membranes of the bubbles were made thick and hardened. This phenomenon is referred to as "foaming," and when the hardening reaction reaches a peak, it is referred to as a "complete foaming," which is commonly known as "stiffening." Further whipping will result in the excessive production of the protein molecules, and the whipped egg white material will become a fragile mass. This is referred to as a "discrete state," which should be avoided.

In order to avoid such discrete state, and to obtain a good foaming, it is necessary to vigorously whip the white material, but to avoid an undue whipping.

In the known kitchen device mentioned above, since the rotary member has a convex or outwardly curved side, the forced circulation of the white material cannot smoothly be made between the inner surface of the container and the convex side of the rotary member, this leading to an insufficient whipping. On the other hand, when the rotary member is excessively whipped, the white material is likely to reach the above-mentioned "discrete state."

SUMMARY OF THE INVENTION

An object of the present invention is to provide a kitchen device capable of whipping a food material, such as the white of eggs, to the desirably foamed extent, without yielding to the above-mentioned discrete state, by means of vigorously whipping the food material, thereby reaching the above-mentioned complete foaming, and then producing an air space adjacent the concave side surface of a rotary member, which is to be used for whipping the food material, in order to discontinue contact between the material with the rotary member.

To achieve this object, in accordance with the present invention there is provided a kitchen device comprising a container for reception of food materials to be whipped by a rotary member, which is mounted at the inside bottom of the container, and a driving mechanism for moving the rotary member about its vertical axis, the configuration of the rotary member being substantially a cone including a side peripheral portion which is concave in vertical cross-section, and the diameter in horizontal cross-section progressively increases toward the lower end of the rotary member.

With the rotary member having such a configuration, during the rotation of the rotary member, the food material is moved by the rotary member around it while being subjected to the influence of the shape of the concave side portion, and thereupon air is introduced into the food material to be mixed with it. The food material containing air bubbles is first actively moved toward the inner surfaces of the container by the movement of the rotary member, and then goes up along the inner surface of the container. Finally, the material, after having changed its course at its upper portion, goes down along the outer surface of the concave side of the rotary member. As a result of such a forced convection circulation, the food material will foam. In specifically explaining the foaming function, since the rotary member is formed to have a concave or inwardly curved side portion, the aforesaid forced convection circulation can readily and actively be caused. As a result, an air space is formed centrally above the rotary member to facilitate the mixture of air with the material while being whipped, and to accelerate the convection of the material. A complete foaming can thus be attained, even if the viscosity of the material becomes larger with the progress of foaming. After the complete foaming is attained, only air is drawn to the concave side surface of the rotary member, and the contact between the rotary member and the material can be broken off to form an air space between them. As a result, excessive whipping can be prevented and the occurrence of the above-mentioned "discrete state" can be restrained.

The rotary member may be comprised of a hollow body either open to, or closed at, the bottom of the member. In either case, the lower end of the rotary member may be provided with a horizontal peripheral flange, which can have smashing power to make the food material into fine pieces. Also, the rotary member may be formed at its lower end periphery with one or more cuts, which increase the smashing power of the member. Such a rotary member makes it possible to produce, for instance, orange juices of the lumpy taste in which the multiple cells of orange pulp are separately scattered, without the membranes of the cells being torn. Also, where the maximum outside diameter of the rotary member at its lower end is d, and the inside diameter of the container at the same level as the lower end of the rotary member is D, the relation between d and D may be defined by $1.7 < D/d < 2.1$, whereupon the foaming function of the food material, such as the egg white, can be improved. Furthermore, in case the side portion of the rotary member is formed along its surface with one or more substantially longitudinal grooves, the mixing of air with the food material can be actively carried out by the capture of air, this resulting in the increase of the foaming function.

The bottom of the rotary member may be closed, and the rotary member may also be provided substantially at its central portion with a vertical hole open at its top wall, and adjacent its lower end with horizontal radial throughholes, which communicate with the vertical holes, whereby the capture of air can be increased further.

Also, the center of the top of the rotary member may be offset laterally relative to the vertical axis of the member. In this instance, the air space to be formed centrally above the rotary member becomes large, and therefore it is possible to draw air into the food material even if the larger quantity of the material is treated.

BRIEF DESCRIPTION OF THE DRAWINGS

FIGS. 2 to 6 show an embodiment of a kitchen device according to the present invention, and FIG. 2 is an elevation, in cross-section, of the kitchen device.

FIG. 3 illustrates a rotary member which is mounted at the inside bottom of a container for reception of food materials.

Figure 4:
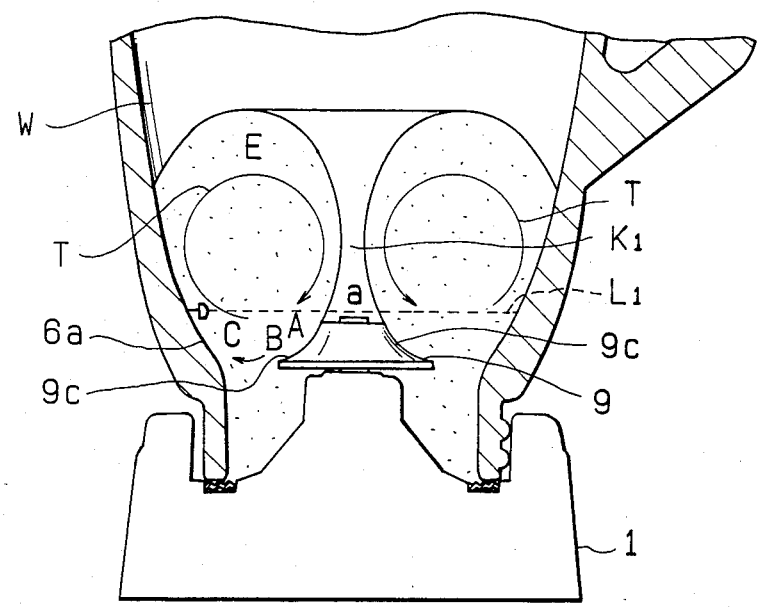
Figure 5:
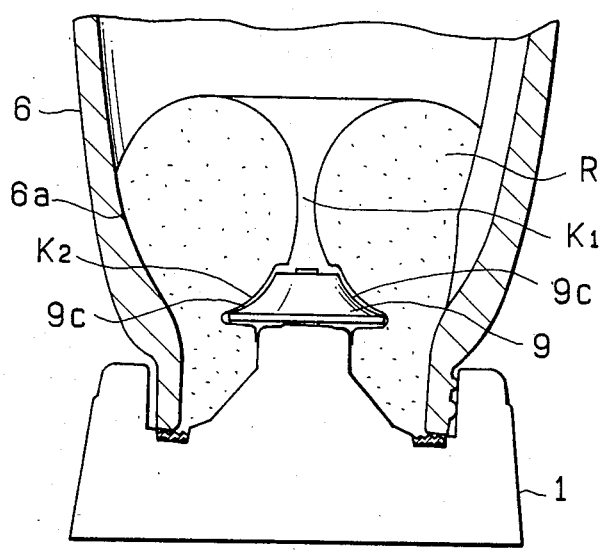

Each of FIGS. 4 and 5 is an elevation, partly broken away and in cross-section, of the kitchen device, showing the main part thereof to illustrate the function of the device.

Figure 6:
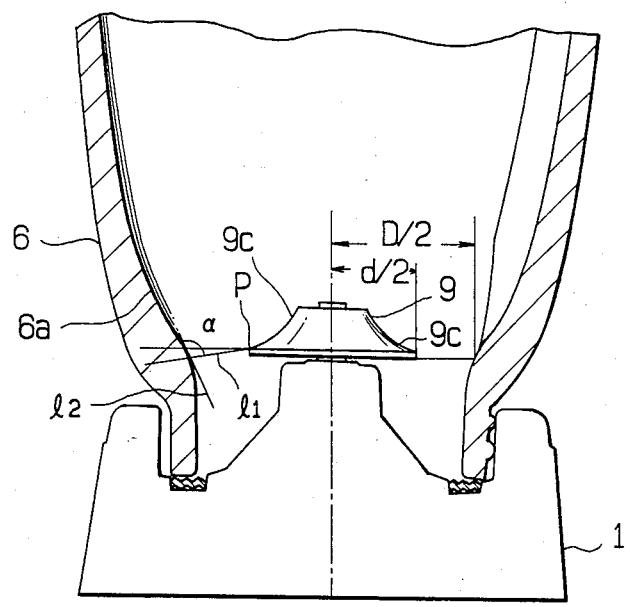

FIG. 6 is an enlargement of the main part of the kitchen device.

Figure 8A:
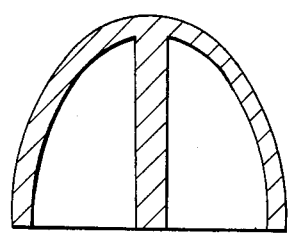
Figure 8B:
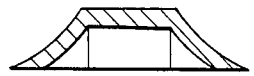
Figure 7:
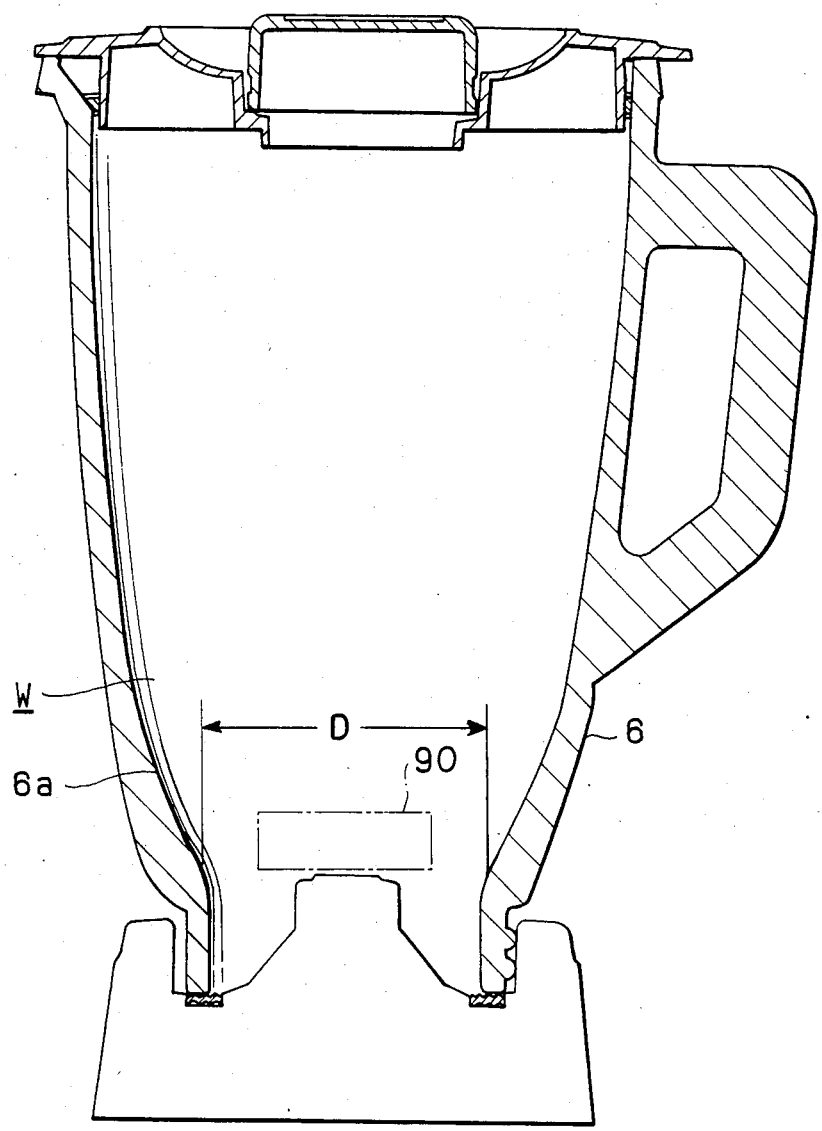

FIG. 7 is an illustration for experimentally comparing the dimensional relation between the bottle and the respective rotary members shown in FIGS. 8A and 8B. FIG. 8A is a cross-section of a conventional rotary member, and FIG. 8B illustrates the dimensions of the rotary member in the present invention.

Figure 9A:
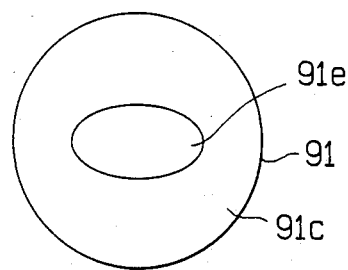
Figure 9B:
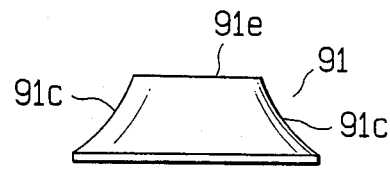

FIG. 9A is a plan view of a modified rotary member, and FIG. 9B is a side view of the rotary member shown in FIG. 9A.

Figure 10:
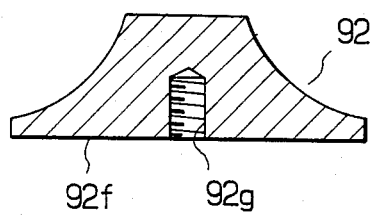

FIG. 10 is a cross-sectional side view of a further modified rotary member.

Figure 11:
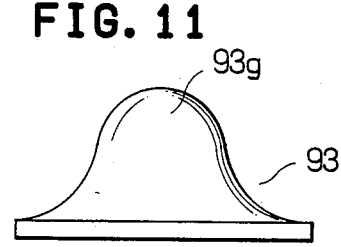

FIG. 11 is a side view of a further modified rotary member.

Figure 12A:
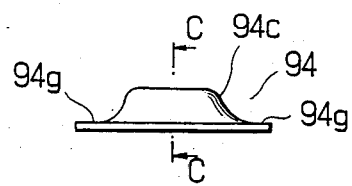
Figure 12B:
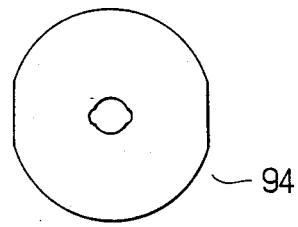
Figure 12C:
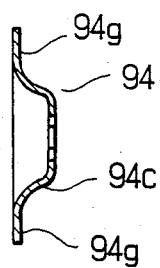
Figure 12D:
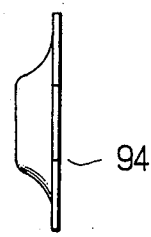
Figure 12E:
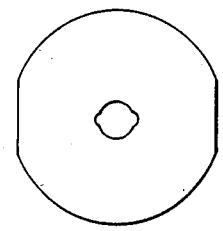

FIG. 12A is a side view of a further modified rotary member, FIG. 12B is a plan view of the rotary member shown in FIG. 12A, FIG. 12C is a cross-section taken along the line C—C of FIG. 12A, FIG. 12D is a view seen from the right or left of FIG. 12A, and FIG. 12E is a bottom view of the rotary member shown in FIG. 12A.

Figure 13:
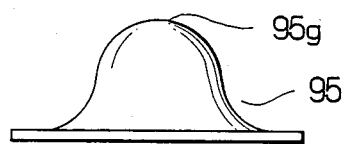

FIG. 13 is a side view of a further modified rotary member.

Figure 14A:
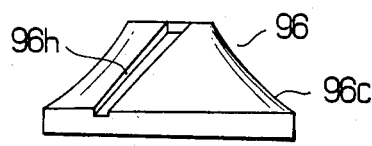
Figure 14B:
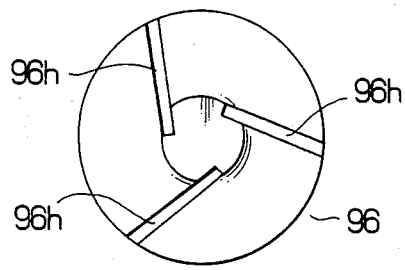

FIG. 14A is a side view of a further modified rotary member, and FIG. 14B is a plan view of the rotary member shown in FIG. 14A.

Figure 15A:
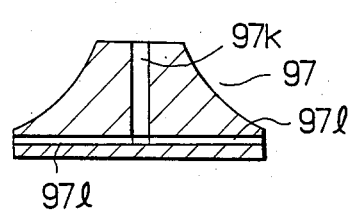
Figure 15B:
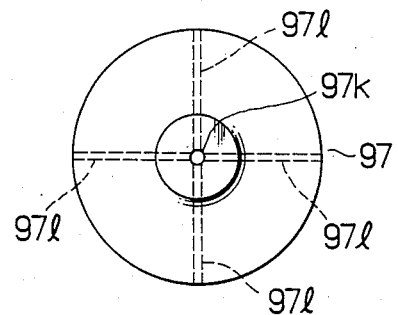

FIG. 15A is a cross-sectional side view of a further modified rotary member, and FIG. 15B is a plan view of the rotary member shown in FIG. 15A.

Figure 16A:
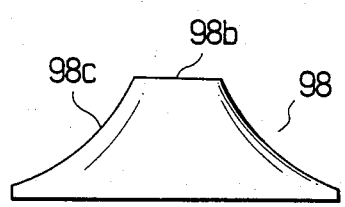
Figure 16B:
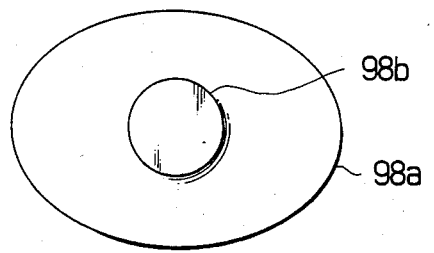

FIG. 16A is a side view of a further modified rotary member, and FIG. 16B is a plan view of the rotary member shown in FIG. 16A.

Figure 17:
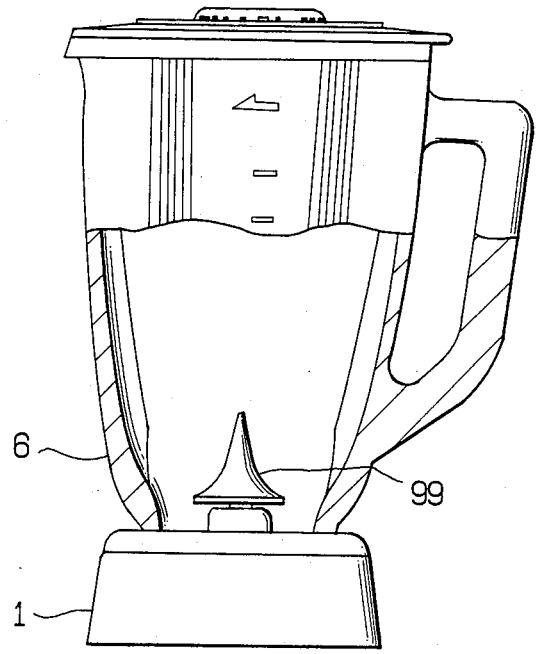

FIG. 17 is a side view showing the main part of another embodiment of the kitchen device.

Figure 18A:
Figure 18B:
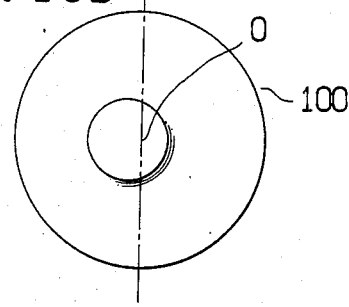

FIG. 18A is a side view of a further modified rotary member, and FIG. 18B is a plan view of the rotary member shown in FIG. 18A.

Figure 19A:
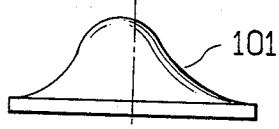
Figure 19B:
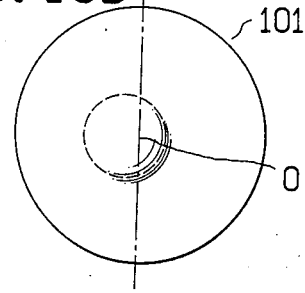

FIG. 19A is a side view of a further modified rotary member, and FIG. 19B is a plan view of the rotary member shown in FIG. 19A.

Figure 20:
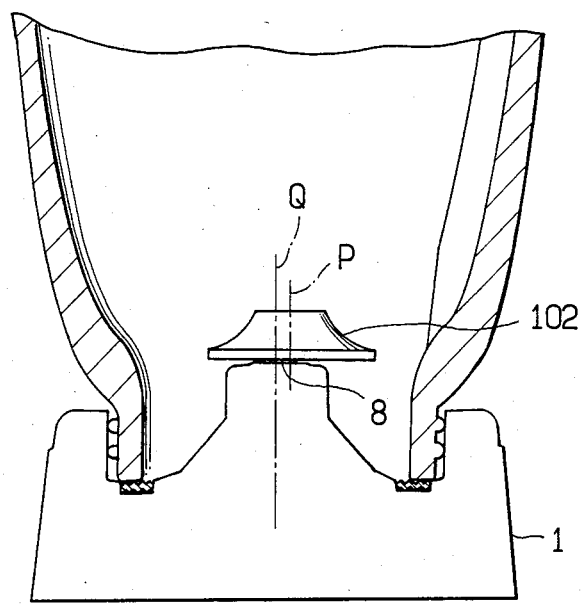

FIG. 20 is a side view showing the main part of another embodiment of the kitchen device.

Figure 21:
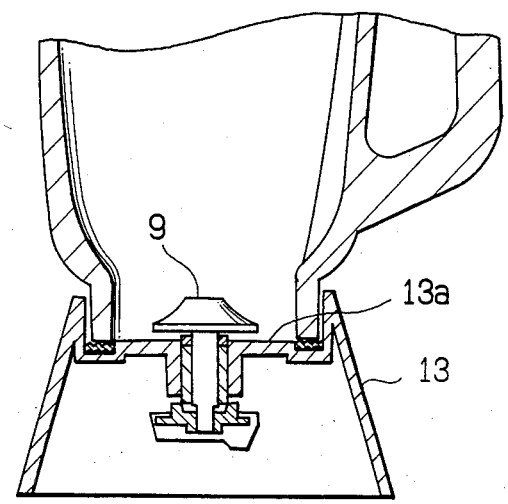

FIG. 21 is a side view showing the main part of another embodiment of the kitchen device.

DESCRIPTION OF THE PREFERRED EMBODIMENTS

Figure 1:
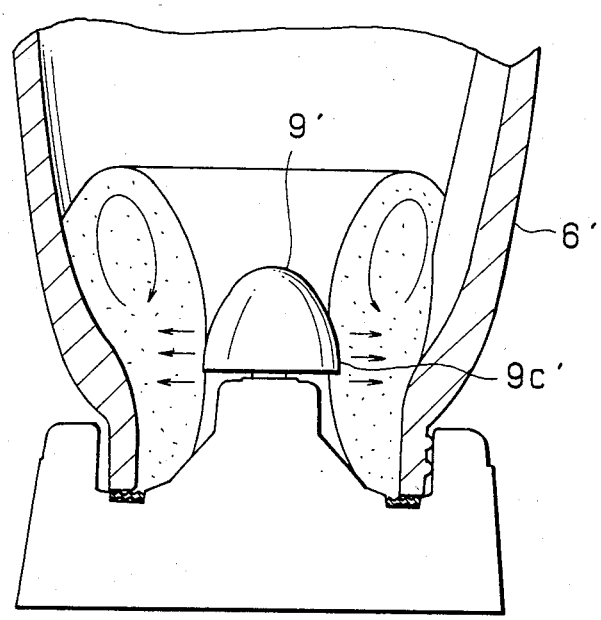
FIG. 1 is a fragmentary sectional view of the known kitchen device.

The known kitchen device, shown in FIG. 1, comprises a half-spindle-shaped rotary member 9', which is mounted at the inside bottom of a cup-shaped bottle 6'. The rotary member 9' has a convex or outwardly curved side 9c'.

FIG. 2 shows a kitchen device of the present invention, and a base 1 of synthetic resin is mounted on a casing (not shown) housing a driving mechanism including an electric motor. The substantially central upper portion of the base 1 forms a fixture 4 for holding a metal retainer 3 in place, and the retainer 3 receives an upwardly extending bearing 2. A bottle holding portion 5 of the base 1 is spaced from the outer periphery of the fixture 4, and the inner periphery of the bottle holding portion 5 has a helical groove.

A glass bottle 6 is open to both the upper and lower ends, and is threaded into the bottle holding portion 5. An annular packing 7 is placed between the base 1 and the bottle 6 to make the bottle watertight, so that the base 1 cooperates with the bottle 6 to constitute a container W for reception of food materials. The upper end of the bottle 6 is covered by a cap 20 which is provided with an elastic annular fringe 20a, which downwardly extends from the bottom surface of the cap, thereby preventing the food material from splashing out of the bottle.

The bottle 6 man also be mounted on a base provided with a blender capable of cutting food materials, this being not shown.

Figure 3A:
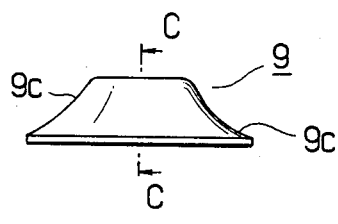
FIG. 3A is a side view of the rotary member.
Figure 3B:
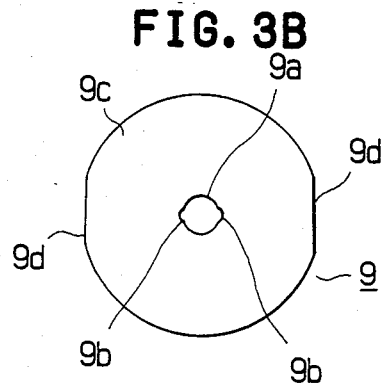
FIG. 3B is a plan view of the rotary member.
Figure 3C:
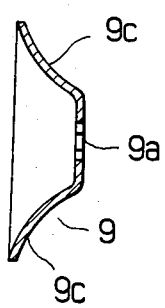
FIG. 3C is a cross-section taken along the line C—C of FIG. 3A.
Figure 3D:
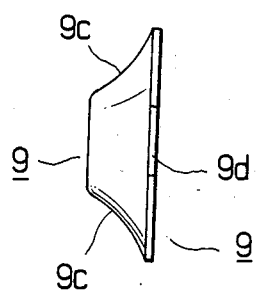
FIG. 3D is a view seen from the right or left of FIG. 3A.
Figure 3E:
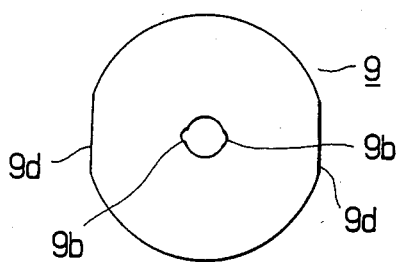
FIG. 3E is a bottom view of the rotary member.

A rotating shaft 8 is supported by the bearing 2 so as to be freely rotatable about its own axis, and is provided at its upper end with a rotary member 9, which constitutes an important part of the present invention. The rotary member 9 is attached to the rotating shaft 8 in such a manner that a washer 10, a cylindrical spacer 11 of a soft metal, for instance, aluminum, and the rotary member 9 are set on the reduced portion 8a of the shaft 8 from the above in that order, and then the top end of the reduced portion 8a is upset. In connection with the upset operation, it should be noted that the rotary member 9 is formed with a central throughhole 9a which has a pair of opposite enlarged portions 9b and 9b (see FIGS. 3B and 3E), and the upset piece of the shaft 8 will intrude into the enlarged portions 9b and 9b so that the rotary member 9 is keyed to prevent lost motion.

A connecting device 12 is adapted to be detachably threaded on the lower end of the shaft 8. Upon foaming operation, the device 12 is coupled to a connector (not shown), which constitutes a part of the driving mechanism, to rotate the shaft 8 at high speed of about 13,000 rpm. It should be noted that the number of rotations of the rotary member 9 necessary for foaming is about 9,000 to 15,000 rpm.

The rotary member 9 is generally of a conical shape or a frustoconical shape. The peripheral side 9c of the member 9 is concave or inwardly curved, and specifically is so formed that the angle between a horizontal line and a tangential line at the peripheral side 9c becomes gradually small toward the lower end. Furthermore, as shown in FIG. 6, the positional relation between the peripheral side 9c and the inner surface 6a of the bottle 6 is such that the angle α between the tangential line $l_1$ at the lower end P of the peripheral side 9c and that of the inner surface 6a at the same level as the lower end P is formed to have an obtuse angle, and the relation between the maximum diameter d of the rotary member 9 and the inside diameter D of the bottle 6 at the same level as the portion of the rotary member 9 having the maximum diameter d is arranged to be $1.7 < D/d < 2.1$.

In this embodiment, the diameter D is 80 mm; the rotary member 9 is formed by pressing a sheet of stainless steel; and the peripheral side surface is made smooth, but the surface may be made coarse.

The lower end periphery of the rotary member 9 is formed with a pair of opposite cuts 9d and 9d (see FIGS. 3B and 3E), whereby it is possible to manufacture not only foamed foods but also orange juices of the lumpy taste.

In use of the kitchen device, the white of more than three eggs, for instance, four eggs, is put into the container W so that at least part of the rotary member 9 is under the white (in FIG. 4, the surface of the white is shown by the dotted line $L_1$), and the rotary member 9 is moved about its axis at high speed. Forced convection shown by the letter T in FIG. 4 is caused in the direction of the rotation of the rotary member, by the contact between the white and the peripheral side 9c of the rotary member rotating at high speed. Specifically speaking, the egg white portion, shown by the letter A, adjacent the top of the peripheral side 9c is first moved toward the peripheral side 9c by the movement of the rotary member 9, while air is pulled into, and mix with, the egg white, and then is guided along the inwardly curved surface of the peripheral side 9c toward its lower end shown by the letter B. Thereafter, the egg white containing air bubbles is vigorously pushed away from the rotary member 9 toward the direction shown by the letter C; dashes against the inner surface 6a of the bottle 6; turns upwardly at the portion D of the surface to go up along the curved surface portion; turns reversely as shown by the letter E to go down; and returns to its original portion A. Thus, the forced convection T is formed.

The egg white is stirred by such forced convection T. Since the peripheral side 9c of the rotary member 9 is formed to have an inwardly curved surface, the forced convection gains strength. As a result, an air space $K_1$ is produced at a portion a above the top of the rotary member 9, and air is actively pulled into the egg white. Therefore, even if the viscosity of the egg white becomes larger with the progress of foaming, the complete foaming can be attained in a short time, for instance, about sixty second for the white of four eggs, because of the vigorous convection of the white. After the complete foaming is attained, only air is actively drawn to form an air space $K_2$ between the rotary member 9 and the egg white R so as to break the contact between them, as shown in FIG. 5. Therefore, the excessive whipping of the egg white R, and accordingly the "discrete state" of the egg white can be avoided.

After the air space $K_2$ is formed, the rotary member 9 freely rotates, and therefore an operator can recognize the completion of the foaming of the egg white with the change in sound of rotation of the rotary member 9, whereby he can switch off a motor to stop the operation of the device.

Upon processing the white of more than six eggs, the amount of the white is too much to form the air space $K_1$ above the rotary member 9, although the white can foam. Furthermore, even if the foaming operation of the white is completed, the air space $K_2$ cannot be formed. At this time, it is necessary for the operator to stop the movement of the rotary member 9 at the right time to avoid the occurrence of the "discrete state" of the white.

A foaming test was carried out with respect to the various values of a ratio D/d (FIG. 6), as shown in Table 1 described below. When D/d is about 1.9, the most foamed state was observed. In the Table, the mark × indicates a non-foamed state; the mark ○ a foamed state; and the mark ◎ the most foamed state, while an air space is formed between the rotary member 9 and the egg white.

TABLE 1

| D/d | 1.7 | 1.8 | 1.9 | 2.0 | 2.1 |
|---|---|---|---|---|---|
| "foam" state | x | ○ | ◎ | ○ | x |

The egg white R in the completely foamed state, as shown in FIG. 5, can readily be taken out of the bottle 6 through the lower end hole thereof by demounting the base 1 from the bottle 6.

It will be clear from the above descriptions that the generally cone-shaped rotary member with a concave or inwardly curved peripheral side can produce the egg white in the good foamed state as compared with the conventional rotary member. The experimental comparison between the rotary member of the present invention and the known member was carried out. The bottle 6 shown in FIG. 7 was used. Specifically, the height of the bottle 6 is 213 mm, the inner diameters thereof at the upper and lower ends are 129 mm and 65.8 mm, respectively, the inner diameter D thereof at the same level as the lower end of the rotary member is 80 mm, and the volume of the bottle is 1200 ml. As for the rotary members used, which are mounted at the inside bottom of the container W comprised of the bottle 6 and the base 1, the known member is of a half-spindle shape, which has the height of 35 mm and the diameter of 45 mm at its lower end, as shown in FIG. 8A, while the member 90 of the present invention has the height of 10 mm, and the diameters of 16 mm and 40 mm at the top and lower ends, respectively, as shown in FIG. 8B. Both of these rotary members used were selected to have optimum dimensions relative to those of the bottle 6 shown in FIG. 7.

The foaming experiment of the white of three eggs, which has the initial volume of 101 cc, was carried out for the kitchen devices of both the known technique and the present invention, the dimensions of these devices being such as described above, the number of rotation of the rotary members being 13,000 rpm. The experimental result is shown in Table 2, as follows:

TABLE 2

|  | known device | present device |
|---|---|---|
| volume after foaming | 250 cc | 322 cc |
| magnification | 2.48 | 3.19 |
| foaming time | 40 sec | 39 sec |
| foamed state | 60% | 90~100% |
|  | lose shape (limp) | retain shape (stiff) |
|  | discrete | indiscrete |
| convection state | lower in the latter half | unchanged |

It will be clear from the above table that in the known rotary member the extent of the foamed state is about 60% after the lapse of 40 seconds, while in the rotary member of the present invention the extent of the foamed state reaches 90~100% after 39 seconds, and the free rotation of the rotary member was caused. One of the fundamental principles on the foaming of the food material is generally to introduce air into the material as much as possible, and to scatter it thereinto. According to the experimental results, in the known device the egg white swelled 2.48 times the quantity of the initial volume after 40 seconds, while in the present device it swelled 3.19 times. This shows that the present device can introduce a large quantity of air into the egg white in comparison with the known device, and the introduction of much air can cause the free rotation of the rotary member. Generally, the protein of the egg white will change in quality and harden in proportion as the white foams. Further stirring will cause the discrete state of the white as explained above. Since in the known device the introduction and scattering of air into the white is limited, part, and particularly the portion adjacent to the rotary member, of the white will excessively be stirred, and it was observed that the white was partly in the discrete state, although it was in the foamed state of 60% as a whole. On the contrary, in the device of the present invention such a difficulty as in the known device was avoided because of the introduction and scattering of a large quantity of air into the white. Moreover, in the known rotary member having such a configuration as shown in FIG. 8A, food materials tend to stick to the interior of the rotary member during operation, and therefore much time is required for cleaning the member. On the contrary, in the rotary member of the present invention shown in FIG. 8B, it is advantageous in that food materials rarely stick to the interior of the rotary member, and therefore clearance work is easy.

The above explanation was made mainly on the foaming of the egg white, but it should be noted that the kitchen device of the present invention is not limited to such an application, and can apply to the processing of various food materials. For instance, salad dressing, mayonnaise, or the like can be processed, while air is satisfactorily mixed with these materials, and even if the cap 20 is uncovered, no material splashes out of the bottle. Also, the kitchen device of the present invention can manufacture products where partially smashed solid grains are scattered, and in this instance it is noted that the rotary member 9 with the lower end periphery having a complete circle, has almost no smashing power, and that therefore a long time is required to manufacture such products. In case the rotary member 9 comprises the lower end periphery having one or more cuts 9d, as shown in FIG. 3, the smashing power of the member will be increased, whereby it is possible to produce, for instance, orange juices of the lumpy taste where multiple cells of orange pulp are separately scattered therein, without the membranes of the cells being torn. The kitchen device of the present invention can also manufacture a grated yam.

It should be noted that the configuration of the rotary member is not limited to the above ones, and can be variously modified within the scope of the present invention defined in claim 1. Various modifications regarding the configuration, and the arrangement relative to the bottle, of the rotary member will now be explained with reference to FIGS. 9 to 21, in comparison with the rotary members explained above.

The rotary member 91 shown in FIG. 9 is different from the rotary member 9 in that the flat top 91e of the member 91 is of an oval shape, and that the member 91 is not formed at its lower end periphery with the above-mentioned cuts 9d, although its side periphery 91c is concave or inwardly curved. The rotary member in FIG. 9 has the same function as that of the rotary member 9.

The rotary member 92 shown in FIG. 10 is different from the rotary member 9 in that the member 92 is solid. Since the bottom surface 92f of the member 92 can contribute to stirring operation, the rotary member 92 is superior in foaming operation to the rotary member 9. Moreover, the rotary member 92 is formed a threaded hole 92g, it can readily be mounted on the reduced portion 8a of the rotary shaft 8.

The rotary member 93 in FIG. 11 has a convex or upwardly curved top surface 93g, and therefore has a height greater than that of the rotary member 9, and the more amount of the egg white can be used to form the air space $K_1$.

The rotary member 94 in FIG. 12 is formed at its lower end with a horizontal peripheral flange 94g, which can increase a smashing power. Since the member 94 is also provided with a concave side 94c, it has the same function as that of the rotary member 9.

The rotary member 95 in FIG. 13 is similar to that in FIG. 12 except that the member 95 has a convex top surface 95g, not flat surface.

The rotary member 96 in FIG. 14 is formed along the surface of the concave side portion 96c with three substantially longitudinal grooves 96h, which serve as means for pulling air into the food material.

The rotary member in FIG. 15 is formed with a vertical hole 97k open at its top wall and four horizontal radial throughholes 97l, which communicate with the vertical hole, as shown in the figure, so that the capture of air can be increased further. The rotary member 97 can be mounted on the upper side of a disc (not shown) which is fixed on the top end of the shaft 8.

The rotary member 98 in FIG. 16 is different from the rotary member 9 in that the bottom surface 98a is of an oval shape, although the member 98 has a configuration similar to the rotary member 9, i.e., a circular top wall 98b and a concave or inwardly curved peripheral side 98c. The rotary member 98 can produce juices containing multiple grains of pulp scattered therein, even if it is not provided at the lower end periphery with the above-mentioned cuts.

The rotary member 99 in FIG. 17 is different from the rotary member 98 in that the member 99 is tapered into the sharp top, and therefore has a height greater than that of the member 98, and the more amount of the food material can be processed.

In FIGS. 18 and 19, the center of the top of each of the rotary members 100 and 101 is offset laterally with respect to the axis of rotation of the member. According to such a configuration the above-mentioned air space $K_1$ can be formed more largely.

In FIG. 20, the rotary member 102 is identical in shape to the rotary member 9, but the member 102 is mounted on the shaft 8 so that the center P of the member is offset laterally relative to the vertical axis Q of the shaft. The device of such an arrangement has a function similar to those of the devices having the rotary members 100 and 101 shown in FIGS. 18 and 19.

FIG. 21 shows a modified kitchen device of the present invention, and the upper surface 13a of a base 13 is made flat.

The rotary member may be made of synthetic resin in place of stainless steel. Also, another rotary member (not shown), which is a combination of two similar rotary members 9 with their bottoms facing each other, may be used.

We claim:

1. A kitchen device adapted for whipping food material, which comprises:

a container for the reception of food materials;

a rotary member mounted at the inside bottom of the container for whipping the food materials contained therein, the rotary member having a hollow body and an open bottom end, the rotary member being shaped substantially in the form of a cone, the rotary member including a side periheral portion which is concave in vertical cross-section, the rotary member including a lower end, and a horizontal peripheral flange disposed at the lower end, the rotary member further having at least a pair of symmetrical recessed flat surfaces formed in the horizontal peripheral flange, the rotary member having a diameter in horizontal cross-section which is progressively increasing toward the lower end thereof, the rotary member being adapted to rotate about its vertical axis; and a driving mechanism for moving the rotary member about its vertical axis.

2. A kitchen device according to claim 1, characterized in that where the maximum outside diameter of the rotary member at its lower end is d, and the inside diameter of the container at the same level as the lower end of the rotary member, D, $1.7 < D/d < 2.1$.

3. A kitchen device according to claim 1, characterized in that the side peripheral portion is formed along its surface with one or more substantially axial grooves.

* * * * *